United States Patent [19]

Kim et al.

[11] Patent Number: 5,108,713
[45] Date of Patent: Apr. 28, 1992

[54] APPARATUS FOR THE CONTINUOUS PRODUCTION OF HIGH ULTRA-FINE, ALUMINUM NITRIDE POWDER BY THE CARBO-NITRIDIZATION OF ALUMINA

[75] Inventors: Jonathan J. Kim, Williamsville; Viswanathan Venkateswaran, Amherst; Randolph Kujawa, Grand Island, all of N.Y.

[73] Assignee: The Carborundum Company, Cleveland, Ohio

[21] Appl. No.: 483,475

[22] Filed: Feb. 21, 1990

Related U.S. Application Data

[60] Division of Ser. No. 283,337, Dec. 12, 1988, abandoned, which is a continuation-in-part of Ser. No. 918,980, Oct. 15, 1986, abandoned, which is a continuation-in-part of Ser. No. 918,911, Oct. 15, 1986, Pat. No. 4,790,986.

[51] Int. Cl.$^5$ ............................................... F27B 15/08
[52] U.S. Cl. ................................... 422/145; 422/139; 422/146; 422/156; 422/236; 422/DIG. 16; 423/DIG. 16; 34/57 A
[58] Field of Search ............... 422/139, 145, 156, 146, 422/236; 34/57 A; 110/245; 122/4 D; 431/7, 170; 423/DIG. 16

[56] References Cited

U.S. PATENT DOCUMENTS

| | | | |
|---|---|---|---|
| 987,408 | 3/1911 | Serpek | 423/137 |
| 1,188,770 | 6/1916 | Hershman | 423/412 |
| 1,268,240 | 6/1918 | Greulich et al. | 423/412 |
| 2,525,925 | 10/1950 | Marshall | 196/52 |
| 2,528,098 | 10/1950 | White | 263/21 |
| 2,647,738 | 8/1953 | Trainer | 263/43 |
| 2,698,171 | 12/1954 | Schoenmakers et al. | 263/21 |
| 2,786,280 | 3/1957 | Gishler et al. | 34/1 C |
| 2,870,002 | 1/1959 | Johnson | 75/9 |

(List continued on next page.)

FOREIGN PATENT DOCUMENTS

| | | |
|---|---|---|
| 521842 | 2/1955 | Canada . |
| 631097 | 11/1961 | Canada . |
| 55-62804 | 5/1980 | Japan . |
| 797756 | 10/1974 | U.S.S.R. . |
| 23544 | 2/1912 | United Kingdom . |
| 277715 | 12/1928 | United Kingdom . |
| 784126 | 10/1957 | United Kingdom . |
| 1045626 | 10/1966 | United Kingdom . |

OTHER PUBLICATIONS

R. H. Lombard, General and Physical Chemistry, 1932, vol. 2, p. 3433, Chemical Abstracts.

*Primary Examiner*—Robert J. Warden
*Assistant Examiner*—Laura E. Collins
*Attorney, Agent, or Firm*—Joseph G. Curatolo; Larry W. Evans

[57] ABSTRACT

A process and apparatus for the manufacture of high purity, ultra-fine aluminum nitride powder by the carbo-nitridization of alumina. In the method, agglomerates uniform in both size, chemical composition and porosity are formed containing a stoichiometric mixture of alumina and carbon, and a small amount of catalyst, and furnaced in a controlled manner in a well-mixed two chamber reaction vessel having optional top or bottom fluidizing gas feed to achieve a uniform and consistent level of conversion. Milling of the as-reacted agglomerates under a controlled atmosphere will produce high purity, micron sized aluminum nitride powder. The reactor is an automatically controlled fluid bed reactor for treatment of refractory materials with a hot fluidizing gas having a two chamber design in which the lower furnace chamber and reactor bed are removable from the bottom of the reactor. With unique reactor, unusually high reaction temperatures of up to 2000° C. are obtainable. Further, the bottom removal feature allows for easy servicing of the reactor. Still further, the fluidizing gas may be introduced via a conduit and a bubble cap from above or below the reactor. If from below, wear on the conduit will be reduced because in such a configuration the conduit will not extend through the bed of the reactor. If the gas is introduced from above, the gas will be preheated by means of countercurrent heat flow, enabling more efficient operation of the reactor.

18 Claims, 2 Drawing Sheets

U.S. PATENT DOCUMENTS

| | | | |
|---|---|---|---|
| 3,032,398 | 5/1962 | Clair | 23/192 |
| 3,151,944 | 10/1964 | Stevens et al. | 23/288 |
| 3,304,249 | 2/1967 | Katz | 204/164 |
| 3,307,908 | 2/1967 | Mandorf, Jr. | 23/192 |
| 3,334,974 | 8/1967 | Molyneux et al. | 23/344 |
| 3,542,347 | 11/1970 | Goldney et al. | 263/21 |
| 3,967,975 | 7/1976 | Idaszak | 422/145 |
| 4,035,152 | 7/1977 | Yang et al. | 23/284 |
| 4,160,813 | 7/1979 | Markel et al. | 423/448 |
| 4,288,407 | 9/1981 | Markel et al. | 422/146 |
| 4,371,033 | 2/1983 | Stendahl | 165/104 |
| 4,473,534 | 9/1984 | Tanaami et al. | 422/311 |
| 4,547,151 | 10/1985 | Takeda | 34/57 A |
| 4,818,511 | 4/1989 | Nishi et al. | 34/57 A |
| 4,854,249 | 8/1989 | Khinkis et al. | 431/7 |
| 4,896,631 | 1/1990 | Holm et al. | 122/4 D |
| 4,961,705 | 10/1990 | Schulz et al. | 110/245 | divi# APPARATUS FOR THE CONTINUOUS PRODUCTION OF HIGH ULTRA-FINE, ALUMINUM NITRIDE POWDER BY THE CARBO-NITRIDIZATION OF ALUMINA This is a division of copending application Ser. No. 07/283,337 filed Dec. 12, 1988 now abandoned, which is a continuation-in-part of co-pending patent applications, Ser. No. 918,980 now abandoned entitled "Process For The Continuous Production Of High-Purity, Ultra-Fine, Aluminum Nitride Powder By The Carbo-Nitridization Of Alumina" to J. Katz et al and Ser. No. 918,911 now Pat. No. 4,790,986 entitled "Method And Apparatus To Produce A Hot Fluidizing Gas" to J. Kim et al, both filed on Oct. 15, 1986, the teachings of which are incorporated herein by reference.

BACKGROUND OF THE INVENTION

The present invention relates to a method and apparatus to effect heat treatment of materials, such as in the production of aluminum nitride. More particularly, the present invention relates to using a two chamber fluid bed reactor having optional top and bottom gas flow to produce aluminum nitride powder. The apparatus is particularly useful for conversion of agglomerates of aluminum oxide and carbon to high purity, aluminum nitride powder by the continuous reaction of the agglomerates with nitrogen gas at a temperature above 1000° C. It is capable of maintaining a continuously flowing bed at temperatures of up to 2300° C.

In theory, the simplest method to prepare aluminum nitride is to heat aluminum metal in the presence of nitrogen; this method is called direct nitridization. Often this is done in a two-step operation. First, aluminum powder (approximately 300 mesh) is nitrided for an extended period at about 600° C. to form a coating of aluminum nitride, which prevents coalescence of the molten particles. This is followed by a second treatment in nitrogen at approximately 1200°-1400° C. Since this product is unstable to moisture and hydrolyzes very easily, additional heat treatment at about 2000° C. is required. This process is slow, tedious, and not cost effective. Consequently, commercially available aluminum nitride powder is usually very expensive. Further, since aluminum melts at about 660° C. and the reaction of aluminum and nitrogen begins in general at about 800° C., the aluminum melts and coalesces into a pool before the reaction begins, preventing intimate contact of the reactants, and the aluminum nitride coating acts as a skin or barrier to further reactions. Thus, this process has undesirable low yields and large quantities of unreacted aluminum impurities.

Aluminum nitride can also be obtained by reacting nitrogen with a mixture of aluminum oxide and carbon which has been raised to a high temperature. In order to obtain practically complete conversion of the aluminum oxide to the nitride, it is important that the temperature not exceed 1800° C., and there be sufficient nitrogen flow at all times through the entire space filled with the charge of the raw solid material. Any overheating can produce volatilizations which impair the efficiency of the reaction, are detrimental to product quality, and prevent, due to sintering, the continuous operation of the furnace. Lack of nitrogen, even locally, may result in fusion, with partial sintering of the charge, preventing complete nitridation.

U.S. Pat. No. 3,307,908 to Victor Mandorf, Jr. describes a process for preparing aluminum nitride in which a mixture of 30–60% by weight, finely-divided aluminum metal and 70–40% by weight, finely-divided carrier material, such as aluminum nitride and/or aluminum fluoride, are nitrided. In this process, a nitriding atmosphere is provided around the mixture which is inert to aluminum nitride and free from oxygen and other materials which interfere with nitriding, consisting of a mixture of nitrogen and ammonia. The mixture is heated to at least 800° C. while under said atmosphere, to nitride the aluminum to form aluminum nitride.

Another process for preparing aluminum nitride is disclosed in U.S. Pat. No. 3,032,398 to Clair. That process involves forming particulate material composed of aluminum oxide, carbon and calcium aluminate binder, continuously passing the particulate material downward by gravity into an elongated externally heated reaction zone in a electrically heated shaft furnace where the particulate material is heated uniformly to a temperature not in excess of 1750° C., continuously passing a current of nitrogen into said zone, countercurrent to the descended particulate material, to form aluminum nitride. Certain quantities of aluminate of lime, a binder, are required to prevent disintegration during the entire nitriding process, and the binder causes crust formation which hinders the proper downward flow of the aluminum oxide-carbon pellets or agglomerates. The reaction temperature must be kept at 1750° C. or below, otherwise the reaction product is not easy to grind and cannot be used for its intended purpose.

The countercurrent electric shaft furnace disclosed by Clair dictates the process conditions and is not a good reaction vessel for conducting this reaction. Processing below 1750° C. to avoid sintering of agglomerates, also interferes with the flow of nitrogen to the core of the agglomerate. Good gas particle mixing is absent in the reaction vessel and a local lack of nitrogen is a frequent occurrence. This factor, along with the attendent uneven heating which results since the reaction vessel is heated by resistances from the shell inward, cause the endothermic conversion reaction to stop, and the charge to overheat and fuse together along the walls of the reactor. Once all or part of the charge is fused, operation of the shaft furnace becomes difficult since the charge is no longer free flowing. Additionally, hard crusts of calcium and carbon form in the cooler (1200°-1300° C.) parts of the furnace which also hinder the proper downward flow of the agglomerate. In summary, the electric shaft furnace is plagued by poor gas agglomerate mixing, inadequate thermal uniformity and agglomerate flow problems.

Fluid bed reactors are known for use in reacting gases with a particulate solid, and are an alternative to electric shaft furnaces. In a fluid bed reactor, a gas is introduced into a reaction vessel to fluidize particulate material or agglomerates. Generally, the particulate material is introduced from the top of the reaction vessel. Known fluid bed reactors have several disadvantages when a hot fluidizing gas is required as is the case when reacting aluminum oxide and carbon with nitrogen to form aluminum nitride. One difficulty is that maintenance can be frequent because the fluidizing agglomerates may cause excessive wear in the bed area of the fluidizing conduit which travels through the reactor due to agglomerates contacting the gas conduit while under high temperatures and while moving within the bed.

Additionally, maintenance of prior art reactor furnace chambers required top withdrawal of the reactor for servicing the bed, which in turn required removing the upper sections of the reactor. In effect the entire reactor had to be disassembled from the top down before the bed could be accessed, an inefficient maintenance procedure.

Therefore, it is an object of the present invention to provide a process and apparatus for preparing aluminum nitride, which process is capable of a high rate of production, an extremely pure product, and requires minimum maintenance.

It is a further object of the present invention to provide a continuous process and an apparatus for the preparation of aluminum nitride by the carbo-nitridization of alumina, which process is capable of cost effective, efficient production of an extremely pure product.

It is another object of the present invention to provide a process and a device for the preparation of aluminum nitride by the carbo-nitridization of alumina using a catalyst which allows the reaction to be conducted at temperatures in the range of 1600°–1850° C.

These and other objects will be apparent from the description and claims which follow.

SUMMARY OF THE INVENTION

The present invention is an apparatus and process which manufactures high purity, aluminum nitride powder by the carbon-nitridization of alumina in a cost effective and efficient manner.

The apparatus is an automatically controlled fluid bed reactor having a two chamber design in which the lower furnace chamber and reactor bed are removable from the bottom of the reactor. Unusually high temperatures of up to 2300° C. are obtainable with this reactor, even though in making aluminum nitride powder temperatures of less than about 1800° C. are preferred. An automatic controller reduces the requirements for human supervision and operation of the reactor. Bottom removal of the lower furnace chamber and bed of the reactor enables easy servicing of the reactor. With the present design the fluidizing gas may be introduced via a conduit and a bubble cap from above or below the reactor. If the gas is introduced from below, wear on the conduit will be eliminated because in such a configuration the conduit will not extend through the bed of the reactor. If the gas is introduced from above the gas will be preheated by means of countercurrent heat flow, enabling more efficient operation of the reactor. The pressure and temperature within the reactor can be automatically controlled, reducing operator requirements. Finally, the rate of the product produced in the apparatus can be monitored by automation, further reducing operator requirements.

In the process, agglomerates which are uniform in both size and chemical composition and contain a stoichiometric mixture of alumina and carbon and a small amount of catalyst, are formed and furnaced in a precisely controlled, well-mixed, two chamber reaction vessel having optional top and bottom flow to achieve a uniform and consistent level of conversion. The as-reacted agglomerates are milled under a controlled atmosphere to produce a high purity, micron sized powder.

DESCRIPTION OF THE PREFERRED EMBODIMENT

The carbo-nitridization of the alumina takes place via the following overall reaction:

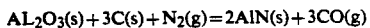

$$AL_2O_3(s) + 3C(s) + N_2(g) = 2AlN(s) + 3CO(g)$$

Figure 1:
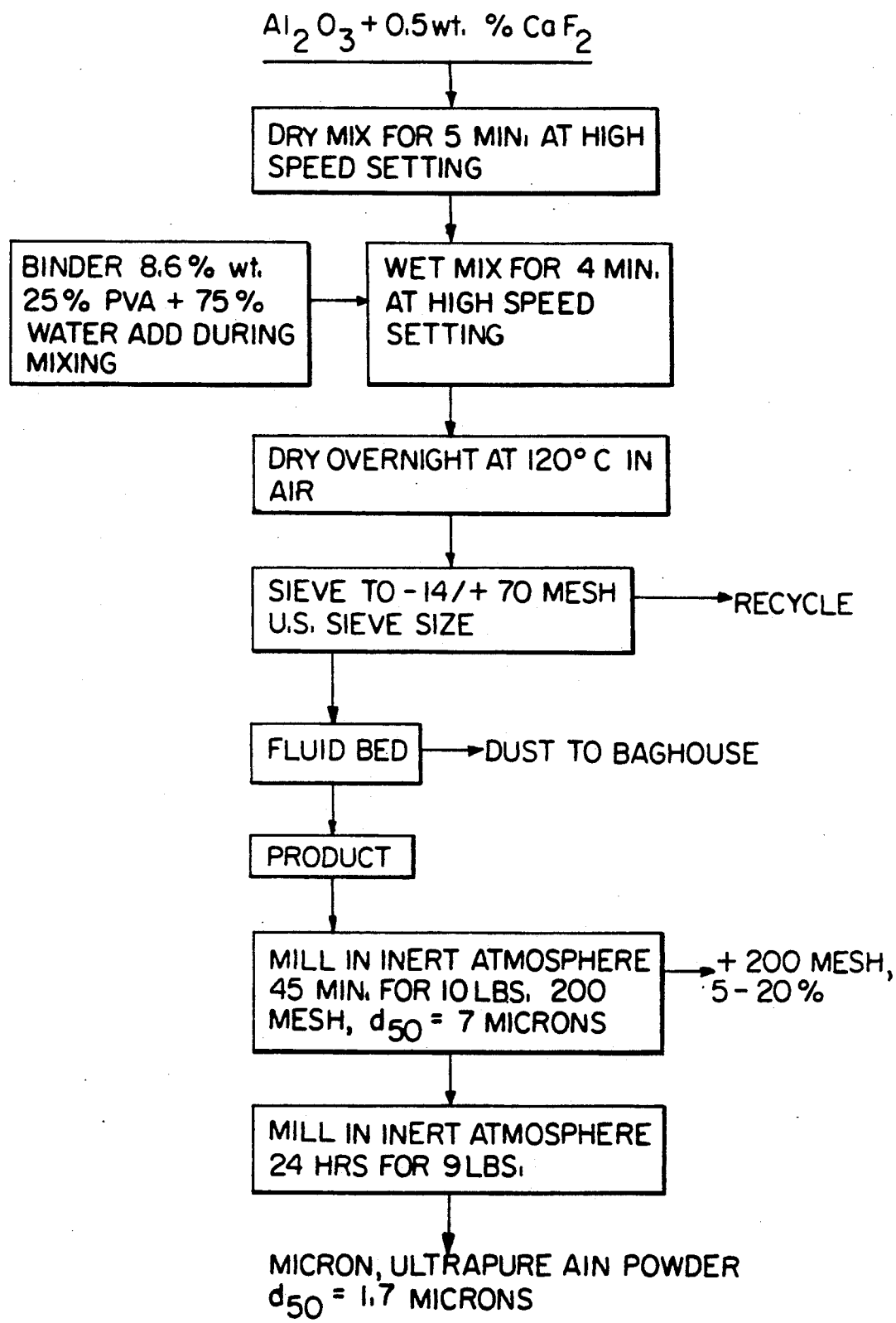
FIG. 1 is a flow diagram of the process of the present invention.
Figure 2:
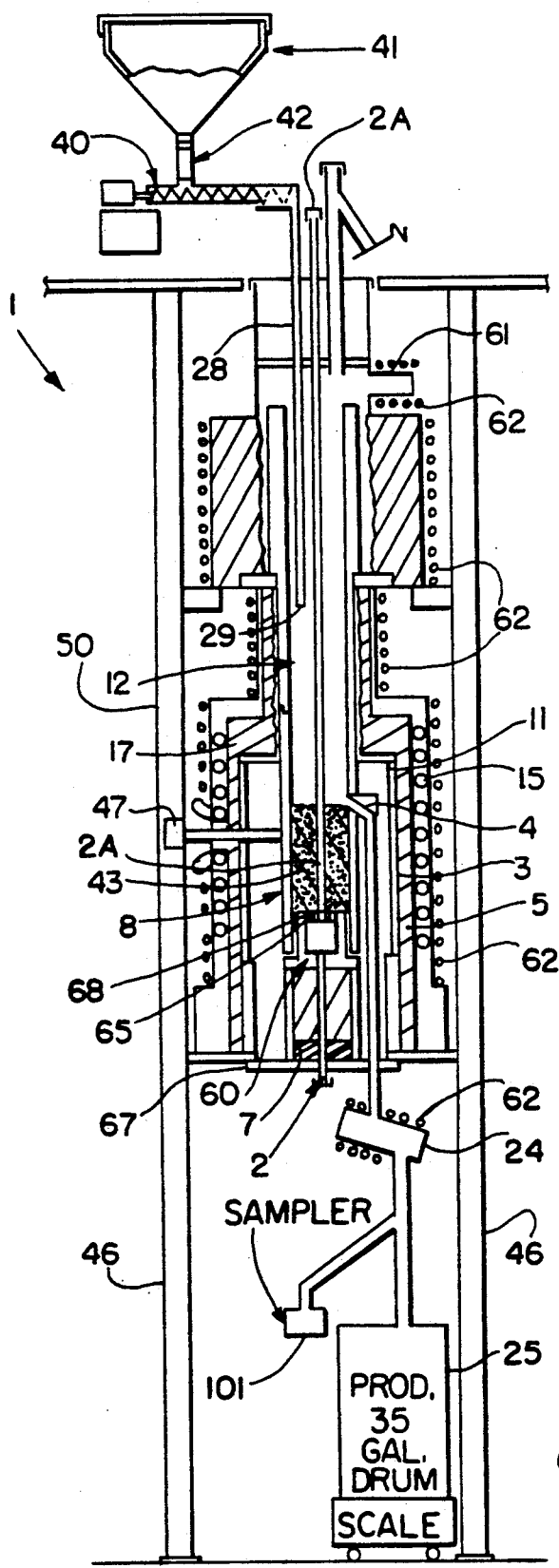
FIG. 2 is a vertical sectional view of the fluid bed reactor and which is the preferred reaction vessel for the process of the present invention.
Figure 3:
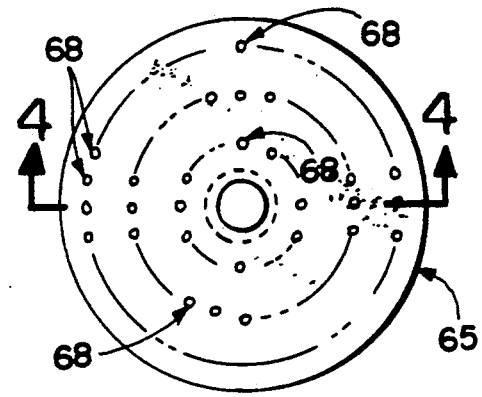
FIG. 3 is a plan view of the lid of the bubble cap of the fluid bed reactor shown in FIG. 2.

A continuous fluid bed reactor is an ideal process reactor for the carbo-nitridization of alumina for several reasons. A fluid bed reactor provides excellent mixing of the agglomerates with a gas phase and good gas utilization. Because of the excellent agglomerates gas mixing, the reactor also has a very even temperature profile. The good thermal mixing results in a uniform reaction, independent of whether the reaction is exothermic or endothermic as in the present case. These factors result in a consistently high and uniform degree of conversion when a continuous fluid bed is used, provided the alumina-carbon pellets are properly produced as described herein. The process of the present invention, the steps of which are outlined in FIG. 1, will be further described in light of the use of a fluid bed reactor which is the preferred reaction vessel for the process of the present invention. As shown in FIG. 2, the fluid bed reactor 1 of the present invention comprises a furnace structure 50 which is in turn comprised of two chambers 8 and 12 in communication with each other. The lower furnace chamber 8 (also known as the reaction chamber) is a cylindrical-shaped graphite tube with a machined bottom and top. The lower furnace chamber 8 is held in place at its bottom by a plate 67. The upper furnace chamber 12 is a cylindrical-shaped graphite tube which is machined at the top and bottom to sleeve fit securely with the lower furnace chamber 8. Thus each chamber is joined to the other by a means which secures the chambers to each other while allowing the chambers to be separated or removed from one another. The upper furnace chamber 12 is held in position by support means (not shown) independent of the lower furnace chamber 8. The upper chamber 12 functions as a disengagement zone where unreacted $N_2$ gas and CO gas by product are separated from the solids in the fluid bed. The preferred materials of construction for both the upper and lower chambers is graphite. The entire furnace is supported by, e.g., four, steel columns 46. All metallic parts are kept at a safe distance from the induction coil 15, described below.

The heat input is provided by, e.g., a thirty-seven turn, induction coil 15, surrounding the lower furnace chamber 8, which heats a susceptor 11. The susceptor is a cylinder, preferably made from graphite, with an open bottom and an open top, although these features are not critical, which is positioned within the area bound by the induction coil 15 and the lower furnace chamber 8. In operation, the susceptor 11 induces or draws energy from the induction coil 15 and heats the lower chamber 8 by radiation. Thus the induction coil is an external and primary heat source and the susceptor means is a secondary heat source. The susceptor 11 acts as a second wall of the reaction chamber in case of damage to the walls of the lower furnace chamber 8. Because of the abrasive nature of the agglomerates, erosion of the wall of the chamber can occur. Insulation 5 is provided in the space between the induction coil and the susceptor 11, preferably by Thermax carbon powder. Carbon felt 17 is used as insulation around the top portion of the induction coil 15 and carbon black 7 provides an additional source of insulation in the reactor 1 for efficient heating.

The fluidized bed 43 is positioned within the lower furnace chamber 8. When the fluid bed reactor 1 is operating under normal operating conditions, the fluidized bed spans the middle portion of the induction coil 15.

For regulated continuous charging, the feed or material to be reacted is introduced into the fluid bed reactor 1 by way of a weighted supply bin or hopper 41. A screw feeder 40 connected to the hopper by a flexible chute 42 transports the feed down a long graphite feed chute 28 to the feed chute end 29 located within the upper furnace chamber 12. The feed then free falls into the lower furnace chamber 8 where treatment will occur.

At the same time, fluidizing gas is supplied through a graphite inlet line or conduit 2 which passes through the bottom 67 of furnace 50. The fluidizing gas enters the bubble cap 60 from the bottom, top, or both the top and bottom of the reactor, depending upon whether the top or bottom gas line valves (not shown) are open or closed. The gas then filters through the bubble cap 60 to the material to be reacted in the lower furnace chamber 8.

Figure 4:
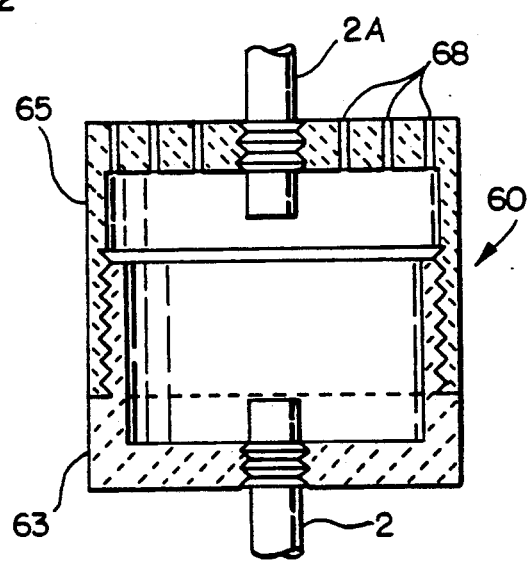
FIG. 4 is a vertical sectional view of the bubble cap of the fluid bed reactor shown in FIG. 2.

The bubble cap 60 as shown in FIG. 4 comprises a graphite chamber 63 having a graphite top or lid 65 fitted to the chamber 63 by use of a screw joint. The lid 65 of the bubble cap 60 is formed with a plurality of holes 68 to distribute the hot fluidizing gas into the reaction chamber 8. The inlet line 2 for the fluidizing gas terminates below the bubble cap 60. The bubble cap 60 is positioned at the lower end of the lower furnace chamber 8. The fluidizing gas is delivered through the inlet line 2 to the bubble cap 60, which is a source below the lower furnace chamber 8, or through inlet line 2A, which is a source above the furnace chamber 8.

In operation, the fluidizing gas travels through the inlet lines 2 or 2A into the bubble cap 60. The gas then rises up through the lid 65 of the bubble cap into the reaction chamber 8. The rising fluidizing gas causes the feed which has been released from the end of the feed chute 29 to fluidize as it remains in the reaction chamber 8. The temperature can be maintained at up to 2300° C. in the reaction chamber 8, and can be checked through a sight tube 47, using, e.g., a pyrometer (not shown).

The feed remains in the reaction chamber 8 for a specified amount of time determined by the quality of the product desired. As described in detail below, an automated controller 101 controls the quality of the product by monitoring and adjusting the pressure and temperature within the reactor 1. The product is continuously discharged by overflow through a discharge opening 4 in the wall of the lower furnace chamber 8 near the surface of the fluidizing bed 43. The hot product is discharged through the product discharge chute 3 connected to the discharge opening 4 which extends from the top of the lower furnace chamber 8 into a rotating water cooled cylinder 24 positioned below the furnace 50 and within the steel frames 46. The cooled product overflows from the cooled cylinder 24 into a pressure tight containment vessel 25. Water cooling coils 62 surround the cooled cylinder 24 to assist the cooling process. The rotary cooler may be purged with an inert gas such as nitrogen so that the product does not become oxidized during cooling.

The hot fluidizing gas from the reaction chamber 8 is led through a water cooled connector tube 61 to a cyclone assembly (not shown) which is lined with appropriate insulation to protect the metal exterior from the 300° C. exhaust gas, and which separates entrained solids. Additional water cooling coils 62 surround the connector tube to effect cooling.

The fluid bed reactor assembly 1 is cooled by cooling water lines 62, which are also used for cooling the power supply (not shown) of the induction coil 15, and the induction coil 15 itself. The reactor allows for automatic control because the pressure and temperature within the reactor and the product discharge quantity and quality can be continuously monitored and controlled by an automated controller 101 in the discharge line. The location of the control monitoring is not critical, as long as it is at a convenient and practical point in the discharge. As the pressure or temperature within the fluid bed deviates from the specified pressure or temperature, the controller 101 activates a high temperature valve to increase or decrease pressure as required, or increases or decreases, shuts on or off the electric field within the coil 15 and to adjust the temperature of the susceptor 11. Similarly, the controller 101 can constantly monitor the quantity of the product produced by the reactor 1 and activate a controller alarm (not shown) notifying the operator of the quantity problem and/or adjusting the inflow or output of agglomerate by altering the rate at which the screw feeder 40 turns.

The fluid bed reactor 1 is designed to allow easy disassembly for maintenance and repair. First, the upper furnace chamber 12 is sleeve fitted to the lower furnace chamber 8 such that it can be removed from the top of the reactor 1 without disturbing the lower furnace chamber 8. Second, the lower furnace chamber 8, which comprises the fluidized bed 43, is sleeve fitted to the bottom of the upper furnace chamber 12 and held in position by a plate 67. This allows removal of the lower furnace chamber 8 from the bottom of the reactor 1 without disturbing the upper furnace chamber 12, which is independently secured to the steel columns 46. By removing only the plate 67, the entire lower portion of the reactor 1, including the lower furnace chamber 8, the fluidized bed 43 and the bubble cap 65, the discharge opening 4, and discharge chute 3, can be removed without breaking down the entire reactor 1.

As noted earlier, the method of the present invention comprises forming agglomerates uniform in both size and chemical composition containing a stoichiometric mixture of alumina and carbon with a small, effective amount of catalyst, furnacing these agglomerates in a well-mixed reaction vessel to achieve a uniform and consistent level of conversion and milling of the as-reacted agglomerates under a controlled atmosphere to produce a high purity micron sized powder. The important variables in the process of the present invention are the quality of the initial reactants, the operating temperature, the nitrogen flow rate, the residence time in the fluid bed reactor, pellet size and pellet feed rate. The method and apparatus of the present invention are an effective way of dealing with these variables to produce a cost effective, high quality product.

The feed material for producing aluminum nitride consists of pellets of aluminum oxide ($Al_2O_3$) and carbon with a catalyst. It is preferable to start to use a high surface area alumina, preferably of more than 7 $m^2/g$ surface area. The catalyst, preferably $CaF_2$, has no detrimental effect on the surface area or size of the aluminum nitride. For example, to make a batch of 60 lbs of feed, 73.5 wt.% of Alumina (A-16) which can be obtained from Alcoa Corporation, 26.0 wt% carbon (Thermax) and 0.5 wt.% of calcium fluoride are dry mixed in a Eirich mixer which can be obtained from Eirich Hachine Inc., New York, N.Y., for five minutes at high setting, to intimately blend the mixture. Agglomeration is accomplished by wet mixing with 12 wt.% of polyvinyl alcohol solution (25% by weight polyvinyl alcohol and 75% by weight water) for four minutes at high setting. The four minutes include the three minutes required to add the polyvinyl alcohol solution. The agglomerated feed is dried in an oven at 120° C. in a pan. The dried agglomerates are sieved through 14 and 70 mesh. The above-mentioned procedure results in 80-85% of the agglomerate in $-14/+70$ size fraction with $d_{50}$ of approximately 35 mesh.

In the reaction process, nitrogen passes continuously into the pellets and carbon monoxide is released. The pellets must therefore be porous and their porosity controls the rate of the conversion reaction. Since the rate of the chemical conversion is in part dictated by pore size and density, it is desirable that the pore size and the distribution of pores within each agglomerate be uniform.

A well-controlled size distribution is desirable to the efficient operation of the continuous fluid bed reactor because the residence time of an agglomerate in the bed is a function of the size of the pellets, with a faster conversion reaction occurring with smaller pellets. Also, segregation of the agglomerates by size within the bed can occur, so size uniformity is desirable. Additionally, if big pellets and small pellets are put into the reactor together, and the pellets are left in until even the big pellets have reacted, grain growth can occur in the smaller pellets. Consideration of the above factors indicate that if the pellet size is not adequately controlled, the products will be non uniform and of low purity.

The gas velocity for fluidization is chosen based on the mean particle size For the case of this illustration, a gas flow rate of 2 standard cubic feed per minute (SCFM) was chosen since this flow rate results in a velocity above the minimum fluidization velocity necessary for a stable bed for a mean agglomerate size of 500 microns. If the size distribution of the agglomerates is too large, the fine particles will be blown out of the top of the bed and the coarse particles will sink to the bottom of the bed.

The agglomerates are formed and then furnaced. Pellets of aluminum oxide, carbon and the catalyst of the desired mesh size are charged through a graphite feed chute which releases the pellets above the fluidized bed. In order to produce high purity aluminum nitride which can be milled to yield ultra-fine powder, the temperature at which the carbo-nitridization reaction is conducted must be considered. At higher temperatures, aluminum nitride grains sinter together into large, hard pellets which are difficult to grind. The reaction should be performed at temperatures low enough so that the appreciable sintering and grain growth are avoided. If a significant amount of sintering occurs, the as-reacted pellets will be difficult to mill, requiring excessive milling time. The amount of milling time to produce micron size powders should be kept to a minimum since contamination during milling is a function of time. Proper control of the reaction temperature is, therefore, essential to produce friable as-reacted pellets which are easily milled, and hence, will maintain their high purity after micronizing. In the present invention, the reaction can be conducted economically at lower temperatures because of the action of the catalyst.

To achieve the desired friability, the reaction must be conducted below 1850° C., preferably in the range of 1600°-1800° C. In the past, it was thought that operating the reactor in such a low temperature range was undesirable in terms of the production rate, since this process, as are most high temperature conversion reactions, is thermally activated and decreasing reaction temperature drastically lowers the production rate. To make production in lower temperature regions practical, the present invention uses a catalyst. Calcium fluoride when added in the correct amount has been determined to behave as a catalyst at the reaction temperature of interest. Concentration of between 0.1 and 0.75 wt% $CaF_2$ have been determined to have a good catalytic effect. Too high a concentration of $CaF_2$ (2.5 wt%) was found to result in diminished catalytic activity. Other fluorides, such as yttrium fluoride ($YF_3$) and sodium fluoride (NaF) are believed to have similar catalytic effect in the process of the present reaction in the 1600°-1800° C. range instead of at higher temperatures. As excessive sintering occurs, the conversion reaction slows down and achieving a high degree of conversion without a large amount of grain growth becomes impossible. Furnacing conditions must be well controlled in order to avoid excessive grain growth. A uniform aluminum nitride grain size is necessary to produce micron sized powder suitable for further processing. Grain growth is undesirable since it makes milling to produce ultra-fine powders very difficult.

The as-reacted agglomerates are then milled. As discussed above, proper control of the reaction temperature prior to milling will decrease the amount of time required to mill to produce micron sized powders. Keeping the milling time at a minimum will also ensure that oxygen pickup is kept to a minimum. Oxygen pickup may be further minimized by performing the milling reaction under the inert atmosphere. Milling can be performed under an inert atmosphere, such as a nitrogen atmosphere. A second milling operation may be performed to achieve a still higher surface area. Among the suitable mills are the Model T-15 Jet Trost Mill, which can be obtained from the Plastomer Division of Garloch, Trost Mill Dept., Newtown, PA 18940, and the Sweco VIBRO Energy Grinding Mill, which can be obtained from Sweco Inc., Los Angeles, CA. Other types of mills may also be accepted. This operation is facilitated by the care taken previously to assure uniformity of the raw powders, the as-agglomerated pellets and of the chemical reaction, as all of these factors are essential for producing a uniform as-reacted aluminum nitride grain size.

It is apparent that many modification and variations of this invention as herein set forth may be made without departing from the spirit and scope thereof. The foregoing embodiments described are therefore to be considered in all respects as illustrative and not restrictive, the scope of the invention being indicated by the appended claims rather than by the foregoing description and all changes which come within the means and range of the claims are therefore intended to be embraced herein.

We claim:

1. A fluid bed reactor for the treatment of refractory material comprising:
   a furnace comprising an upper and lower chamber in a vertical arrangement, each chamber having a means for detachably securing it with the other chamber, the upper chamber being removable from the upper end of the reactor and being held in position within the reactor independent of the lower chamber, the lower chamber being removable from the lower end of the reactor and being held in position by a means at the lower end of the reactor;
   an inlet for refractory materials to be treated at the upper end of the reactor;
   means for feeding the materials into the reactor;
   inlet means for fluidizing gas;
   heating means positioned around the lower chamber;
   a bubble cap means proximal to the bottom of said lower chamber to thereby define a fluidizing bed when said materials are fed into said lower chamber;
   outlet means for the treated product located proximal to the top of the fluidizing bed at the upper end of the lower reaction chamber;
   outlet means for reaction gases at the upper end of the furnace; and
   means for cooling the reaction gases and the treated product.

2. The fluid bed reactor of claim 1 wherein the lower chamber of said furnace is the reaction chamber.

3. The reactor of claim 2 wherein said detachably securing means for said chambers is to machine each chamber to sleeve fit together.

4. The reactor of claim 1 wherein said heating means comprises a susceptor means surrounding said lower chamber and an induction heating means.

5. The fluid bed reactor of claim 4 wherein said susceptor means acts as a second wall of the reaction chamber.

6. The reactor of claim 1 wherein said reactor is capable of operating at a temperature of about 2300° C.

7. The reactor of claim 1 further including valve means for said inlet means for the fluidizing gas.

8. The reactor of claim 1 wherein said inlet means for said fluidizing gas is located at the lower end of said reactor.

9. The reactor of claim 1 wherein said fluidizing gas inlet means is located at the upper end of said reactor whereby the gas is preheated by the fluid bed.

10. The reactor of claim 1 wherein said fluidizing gas inlet means is located at the top and the bottom end of said reactor.

11. The reactor of claim 1 further including means for automatically monitoring and controlling the temperature, pressure or quantity of the treated product.

12. The reactor of claim 1 wherein said bubble cap comprises a chamber with a lid having a plurality of holes.

13. A fluidizing bed apparatus for the continuous treatment of matter at temperatures of up to about 2300° C. comprising:
    a furnace wherein the furnace is held in place by a means at the bottom of the apparatus which allows the furnace to be removed from the bottom of the apparatus by detaching the holding means;
    inlet means for the matter to be treated;
    inlet means for fluidizing gas;
    heating means surrounding the part of the furnace in which the reaction of the matter and the hot fluidizing gas will take place;
    means to disperse the fluidizing gas located at distal end of said inlet means for the fluidizing gas and located at the bottom of said furnace which together with said furnace defines a fluidizing bed for said matter to be treated;
    outlet means for the treated product;
    outlet means for the reaction gases; and
    cooling means for the reaction gases and the treated product.

14. The apparatus of claim 13 wherein the furnace comprises an upper and a lower chamber in a vertical arrangement, each chamber being machined to sleeve fit securely with the other chamber and wherein the lower chamber is the reaction chamber, the upper chamber being removable from the upper end of the reactor and being held in position within the apparatus independently of the lower chamber, and the lower chamber being removable from the lower end of the reactor.

15. The apparatus of claim 13 wherein said means to disperse the fluidizing gas is a bubble cap comprising a chamber with a lid having a plurality of holes.

16. The apparatus of claim 13 wherein said outlet means for the treatment product is located proximal to the top of the fluidizing bed at the upper end of the lower furnace chamber.

17. The apparatus of claim 13 further comprising a water cooled cylinder at the distal end of the outlet means for the treated product into which the treated product is discharged for cooling.

18. The apparatus of claim 17 wherein the water cooled cylinder is continuously purged with an inert gas to prevent oxidization of the product during cooling.

* * * * *